(12) United States Patent
Jiang et al.

(10) Patent No.: US 11,668,232 B2
(45) Date of Patent: Jun. 6, 2023

(54) OBLONG-SHAPED ROTOR ENGINE HAVING HIGH SEALING PERFORMANCE

(71) Applicant: BEIHANG UNIVERSITY, Beijing (CN)

(72) Inventors: Chongwen Jiang, Beijing (CN); Siyuan Pi, Beijing (CN); Chenhao Xu, Beijing (CN); Zhihao Li, Beijing (CN); Zhenxun Gao, Beijing (CN); Chunxuan Li, Beijing (CN)

(73) Assignee: BEIHANG UNIVERSITY

( * ) Notice: Subject to any disclaimer, the term of this patent is extended or adjusted under 35 U.S.C. 154(b) by 0 days.

(21) Appl. No.: 17/613,070

(22) PCT Filed: Apr. 16, 2021

(86) PCT No.: PCT/CN2021/087709
§ 371 (c)(1),
(2) Date: Nov. 21, 2021

(87) PCT Pub. No.: WO2021/213258
PCT Pub. Date: Oct. 28, 2021

(65) Prior Publication Data
US 2023/0053217 A1    Feb. 16, 2023

(30) Foreign Application Priority Data

Apr. 22, 2020  (CN) .......................... 202010320469.9

(51) Int. Cl.
| | | |
|---|---|---|
| *F02B 55/08* | (2006.01) | |
| *F02B 53/00* | (2006.01) | |
| *F02B 53/10* | (2006.01) | |
| *F02B 53/12* | (2006.01) | |
| *F02B 55/02* | (2006.01) | |
| *F02B 55/14* | (2006.01) | |
| *F02F 11/00* | (2006.01) | |

(52) U.S. Cl.
CPC .............. *F02B 55/08* (2013.01); *F02B 53/00* (2013.01); *F02B 53/10* (2013.01); *F02B 53/12* (2013.01); *F02B 55/02* (2013.01); *F02B 55/14* (2013.01); *F02F 11/007* (2013.01)

(58) Field of Classification Search
CPC .......... F02B 53/00; F02B 53/10; F02B 53/12; F02B 55/02; F02B 55/08; F02B 55/14; F02F 11/007
See application file for complete search history.

(56) References Cited

FOREIGN PATENT DOCUMENTS

EP       1956188 A1 * 8/2008 .............. F01C 1/104
JP   2004308639 A  * 11/2004

* cited by examiner

*Primary Examiner* — Audrey B. Walter (57) ABSTRACT

An oblong-shaped rotor engine with improved high sealing performance includes an upper end cover, a lower end cover, a rotor, three combustion chambers, three isolation zones, a fuel spray ignition unit, a sealing pin row and an eccentric driving shaft, a sealing pin row, which seals the transition zone between different combustion cylinders, wherein the engine according to this invention can better avoid the effect of structural wear, effectively enhance the sealing performance between combustion chambers and abate gas leakage between cylinders, wherein the designed profile and sealing means can enlarge the design error margin for engines, abate the processing difficulty of engines, and effectively decrease the production costs of engines.

2 Claims, 5 Drawing Sheets

OBLONG-SHAPED ROTOR ENGINE HAVING HIGH SEALING PERFORMANCE

TECHNICAL FIELD

The invention relates to the technical field of engines, and in particular relates to an oblong-shaped rotor engine with improved high sealing performance.

BACKGROUND ART

Rotor engines are a novel internal combustion engine appeared in the 1950s, which has the advantages of small size, high power-to-weight ratio, and lower vibration and noise, compared with general reciprocating engines. A triangular rotor engine, also called Wankel Engine, provides a more commonly-used technical solution, and is designed by using a double-arc outer trochoid as the cylinder profile and an inner envelope as the rotor profile, and having the gears meshing with each other so as to drive the rotor to make planetary motions along the cylinder, which is a type of four-cycle engines.

In order to ensure the sealing performance of engines during its operation, the three protruding cusps on the triangular rotor of a traditional triangular rotor engine will always rotate at a high speed while resting against the cylinder wall. As the operating time is prolonged, the sealing pin on this part is prone to be worn more severely. Further, considering that a large pressure drop likely to occur between the adjacent cylinders during its operation, wearing the sealing pin will result in the inability to effectively isolate the adjacent cylinders, which will easily lead to the problem of gas leakage between the adjacent cylinders of engines. In addition, because the rotor and cylinder profile of the Wankel Engine is a complex design the allowable processing error margin is small, therefore significantly raises the processing difficulty in actual production.

Liquid Piston Company provided another technical solution on the rotor engine, called X Engine, which has an entire structure similar to that of the Wankel Engine but having its inside and outside in reverse, and is designed by using a double-arc outer trochoid as the rotor profile and an inner envelope as the cylinder profile, both of which still ensure the planetary motion of the rotor through the gears meshing with each other. The X Engine has the rotor profile and cylinder profile of the rotor engine redesigned from the perspective of its inside and outside in reverse. However, this technical solution only exchanged the rotor profile and the cylinder profile with each other arranged inside and outside in order, but failed to change the structure and motion characteristics of the profile itself. Therefore, this solution still has problems such as severe seal wear, gas leakage in the cylinder, and high processing costs.

In order to solve the above problems, it is necessary to design a rotor engine that prevents structural wear, abates gas leakage, and decreases processing costs.

SUMMARY OF THE INVENTION

The present invention provides an oblong-shaped rotor engine having high sealing performance which is different from the existing rotor engine and has a novel engine profile, providing a new engine-sealing method based on the profile change. Compared with the existing rotor engine, the rotor engine provided by the present invention has better spatial sealing performance, better capability to prevent the engine structure from being worn out and effectively abate the gas leakage between the adjacent combustion cylinders. Furthermore, the cylinder profile and the rotor profile are simpler and easier to be processed, which greatly decreases the processing costs of engines. The technical solution adopted by the present invention is as follows:

An oblong-shaped rotor engine having high sealing performance, comprising an upper end cover, a lower end cover, a rotor, three combustion chambers, three isolation zones, a fuel spray ignition unit, a sealing pin row and an eccentric driving shaft, wherein, the upper end cover and the lower end cover are connected with each other by screws to form a cylinder of an engine;

a hollow chamber inside the cylinder is a working chamber used for engine operation, which is suitable for the rotation of the rotor and the thermal cycle of the three combustion chambers, and the working state in the working chamber is defined by the cylinder profile and the rotor profile;

the entire outline of the cylinder profile is triangular, and three protruding inner concaves are evenly arranged along the cylinder in a cycle to form the three combustion chambers, the cylinder profile is formed by the wall curves of the three combustion chambers and the curves of the three isolation zones, the wall curves of the three combustion chambers and the curves of the three isolation zones are alternately arranged along the cylinder in a cycle, so that 120-degrees rotational symmetry presents in the cylinder profile;

the entire outline of the rotor profile is oblong-shaped, the central cavity of the rotor is connected with the central cavity of the upper end cover and the central cavity of the lower end cover through the eccentric driving shaft, the fuel spray ignition unit is installed on the top of the three combustion chambers for a fuel spray and ignition;

when the engine is working, the eccentric driving shaft and the cylinder profile define the motion mode of planetary gears for the rotor, during the rotation of the rotor, compression-expansion periodic motion is formed inside the three combustion chambers, the compression-expansion motion is repeated two times every rotation of the rotor, the respective thermal cycles formed in the three combustion chambers together drive the rotor to rotate and output effective power though the eccentric driving shaft.

the sealing pin rows composed of at least four sealing pins are equidistantly arranged on the three isolation zones, the sealing pins are installed in the pin holes on the three isolation zones, the sliding grooves are installed on the inner walls of the pin holes, the sealing pin can slide through the sliding groove within the sliding scope limited by a block at the end of the sliding groove, the sealing pin has a base connected with the bottom of the pin hole through a spring and a head equipped with an arc-shaped sliding sealing piece, during the rotation of the rotor, the sealing pin row maintains constant contact with the side wall of the rotor, and stably seals and isolates the areas on both sides of the sealing pin row by means of the sliding sealing piece.

Further, the curves of the three isolation zones are all an arc curve, with the parameter equation as follows:

$$\begin{cases} x = e\left(k\cos\left(\frac{2m-1}{3}\pi\right) - q\cos\left[\frac{2m-1}{3}\pi + t\sin^{-1}\left(\frac{3}{k}\right)\right]\right) \\ y = e\left(k\sin\left(\frac{2m-1}{3}\pi\right) - q\sin\left[\frac{2m-1}{3}\pi + t\sin^{-1}\left(\frac{3}{k}\right)\right]\right) \end{cases}$$

wherein, m is serial numbers of the isolation zones with the value range as 1~3, representing the curve of the three isolation zones, respectively; t is variable parameters with the value range as [4.0, 1.0]; k is shape parameters of the cylinder with the value range as 10.0~12.0; e is eccentric distance of the eccentric column on the eccentric driving shaft with the value range as 0.005 m~0.007 m; q is shape parameters of the three isolation zones, representing the ratio between the curvature radius of the isolation zone and the eccentric distance of the eccentric column on the eccentric driving shaft with the value range as 3.0~6.0;

the wall curves of the three combustion chambers have a smooth transition at the intersection with the curves of the three isolation zones, the parameter equation of the wall curves of the three combustion chambers is as follows:

$$\begin{cases} x = e\left[\dfrac{k\cos(2\theta) + (2\cos(3\theta) - q)}{\left(-\dfrac{3}{k}\sin(3\theta)\sin(2\theta) - \cos(2\theta)\sqrt{1 - \left[\dfrac{3}{k}\sin(3\theta)\right]^2}\right)}\right] \\ y = e\left[\dfrac{k\sin(2\theta) + (2\cos(3\theta) - q)}{\left(\dfrac{3}{k}\sin(3\theta)\cos(2\theta) + \sin(2\theta)\sqrt{1 - \left[\dfrac{3}{k}\sin(3\theta)\right]^2}\right)}\right] \end{cases}$$

wherein, $\theta$ is variable parameters with the value range as $$\left[-\frac{1}{6}\pi, \frac{1}{6}\pi\right], \left[\frac{1}{2}\pi, \frac{5}{6}\pi\right] \text{ and } \left[\frac{7}{6}\pi, \frac{3}{2}\pi\right],$$

representing the wall curves of the three combustion chambers, respectively;

corresponding to the cylinder profile, the parameter equation of the rotor curve is as follows:

$$\begin{cases} x = e\left[\cos(2\beta) + \cos(3\alpha - \beta) + k\cos(\alpha - \beta) - q\dfrac{3\cos(3\alpha - \beta) + k\cos(\alpha - \beta)}{\sqrt{k^2 + 9 + 6k\cos(2\alpha)}}\right] \\ y = e\left[\sin(2\beta) + \sin(3\alpha - \beta) + k\sin(\alpha - \beta) - q\dfrac{3\sin(3\alpha - \beta) + k\sin(\alpha - \beta)}{\sqrt{k^2 + 9 + 6k\cos(2\alpha)}}\right] \end{cases}$$

wherein, $\alpha$ is variable parameters with the value range as $[0,2\pi]$, $\beta$ is a rotation angle of the rotor;

when the rotor rotates according to the above equation, it is in motion mode of planetary gears, and whatever angle the rotor rotates to, the rotor and the cylinder keep tangency with each other and the tangency point falling on each curve of the three isolation zones, so that the adjacent combustion chambers are isolated from each other by the tangent point falling on the isolation zone between them.

Further, on the line under the function of the sealing pin, the distance between the intersection of the cylinder profile and the line under the function of the sealing pin and the intersection of the rotor profile and the line under the function of the sealing pin is the distance between the sealing pin and the rotor, if the distance between the sealing pin and the rotor is less than the effective distance of the sealing pins, the sealing pin touches the side surface of the rotor, being in a sealed state; if the distance between the sealing pin and the rotor is more than the effective distance of the sealing pins, the sealing pin does not touch the side surface of the rotor, being in an idle state.

The beneficial effects of the invention are as follows:

1. The rotor profile and the cylinder profile provided by the invention isolate the adjacent cylinders by using a smooth arc making a steady transition over the outside profile of the combustion chamber, so as to ensure that the rotor is in motion mode of planetary gears, and whatever angle the rotor rotates to, the rotor and the cylinder keep tangency with each other, with certainty that the tangency point falls on the curve of the isolation zone. Considering that the boundary cusp on the cylinder profile has disappeared, the engine rotor will also be in more stable rotation, which improves the operation characteristics of engines and can better avoid the effect of structural wear, that is, the effect of structural wear caused by the high-speed rotation of the rotor will also be greatly abated.

The engine-sealing method of arranging sealing pin rows on the smooth arcs of all the boundaries provided by the invention can effectively improve the sealing performance of engines and prevent gas leakage between adjacent cylinders. As the number of sealing pins increases, the coupling error margin between the cylinder and the rotor also becomes larger, which can further decrease the processing costs of engines.

The oblong-shaped curve adopted in the rotor provided by the invention can effectively abate the difficulty in structural processing and decrease the production costs of engines.

BRIEF DESCRIPTION OF THE DRAWINGS

In order to more clearly describe the embodiments of the invention or the technical solutions in the prior art, we will briefly introduce the accompanying figures necessarily used in the embodiments as follows, so as to make the feature and advantage of the invention more clearly understood by referring to the accompanying figures, which are schematic and should not be construed as any limitation on the invention, and from which a person skilled in the art can obtain other figures without creative work, wherein.

FIGS. 6 (a)-(h) are schematic diagrams of the sealing principle of the sealing pin row at different stages of the engine according to the invention.

DESCRIPTION OF ELEMENTS

1—upper end cover; 2—lower end cover; 3—rotor; 4—combustion chamber; 5—fuel spray ignition unit; 6—isolation zone; 7—sealing pin row; 7.1—sealing pin; 7.2—sealing pin; 7.3—sealing pin; 7.4—sealing pin; 8—eccentric driving shaft; 9—screw; 10—sliding groove; 11—spring; 12—sliding sealing piece.

DETAILED DESCRIPTIONS OF THE PREFERRED EMBODIMENTS

In order to have the ability to more clearly understand the above objective, feature and advantage of the invention, we will further describe the invention in detail as follows with reference to the accompanying figures and specific embodiments. It should be noted that the embodiments of the invention and the features in these embodiments can be combined with each other if there is no conflict.

Although many specific details are set forth so as to fully understand the invention in the following description, the invention can also be implemented in other ways different from those described here. Therefore, the protection scope of the invention is not limited by the specific details of the embodiments disclosed below.

Figure 1:
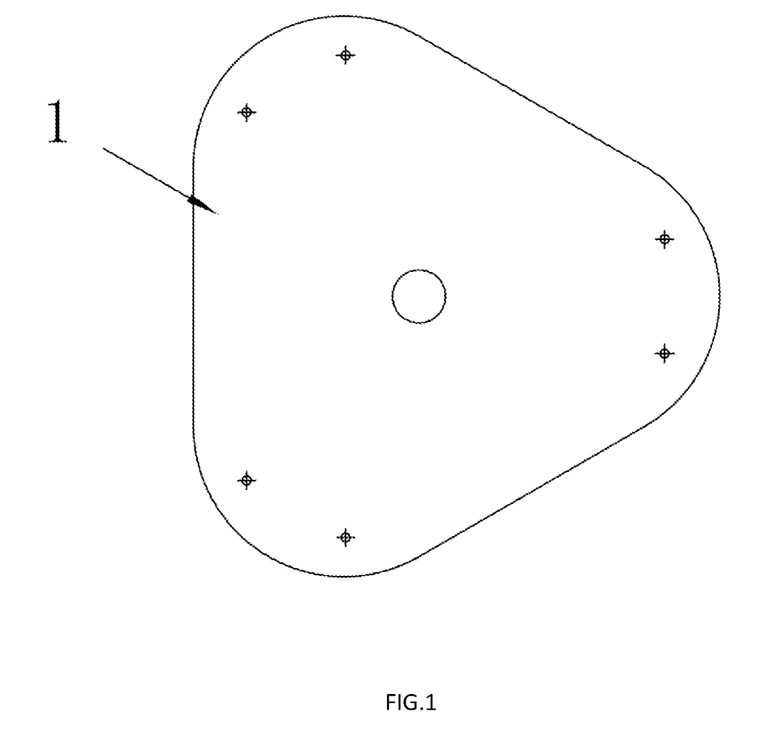
FIG. 1 is a schematic diagram of the upper end cover of the engine according to the invention.
Figure 2:
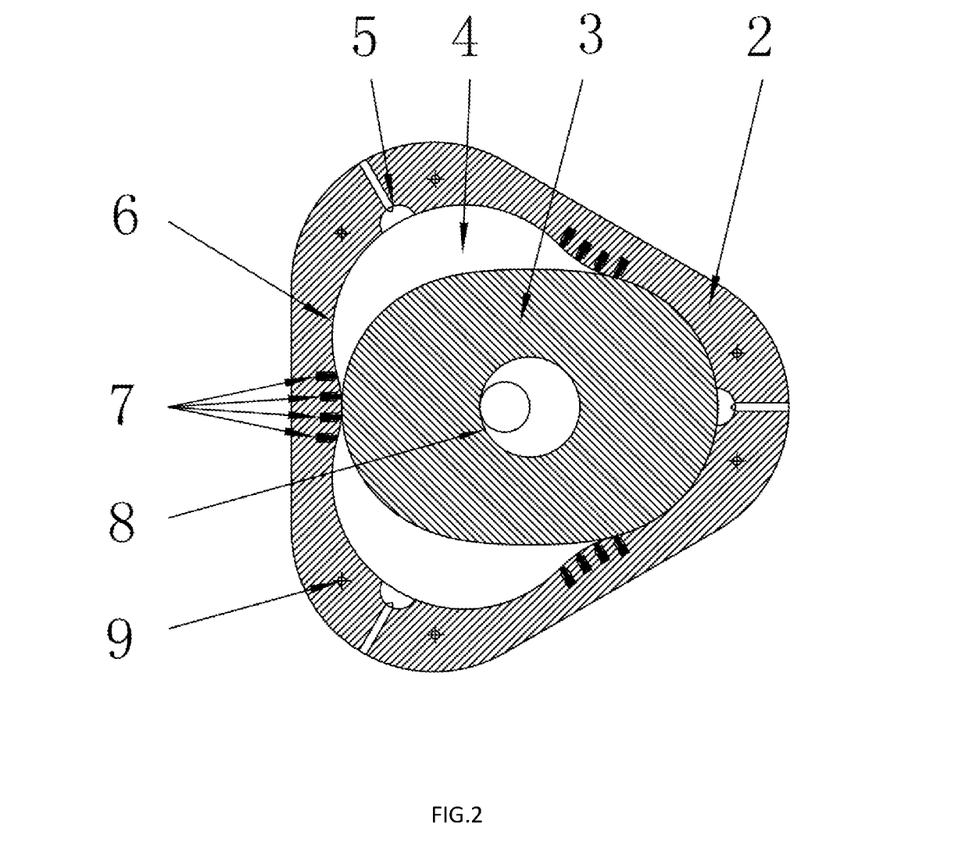
FIG. 2 is a schematic diagram of the lower end cover and rotor of the engine according to the invention.
Figure 3:
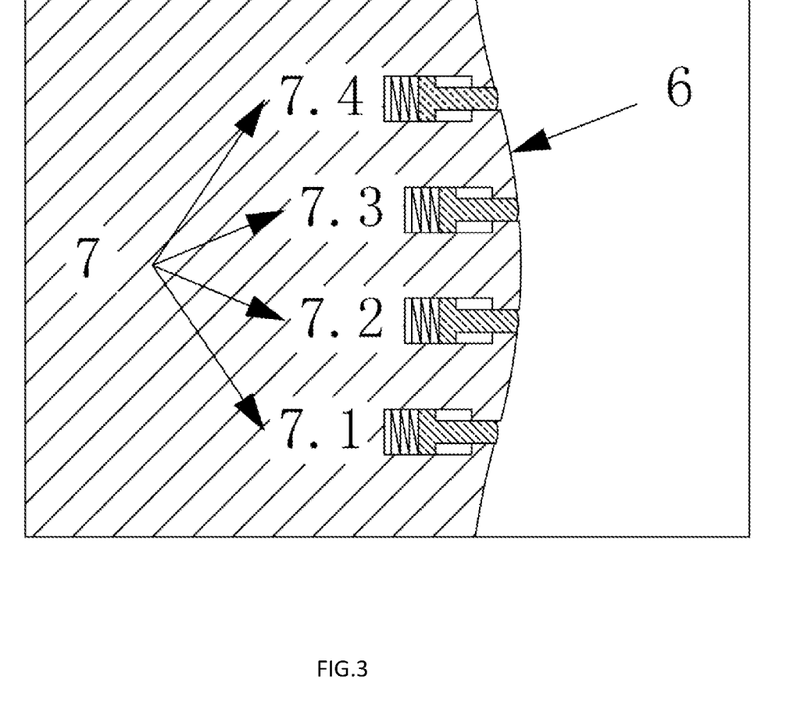
FIG. 3 is a schematic diagram of the isolation zone and sealing pin row of the engine according to the invention.
Figure 4:
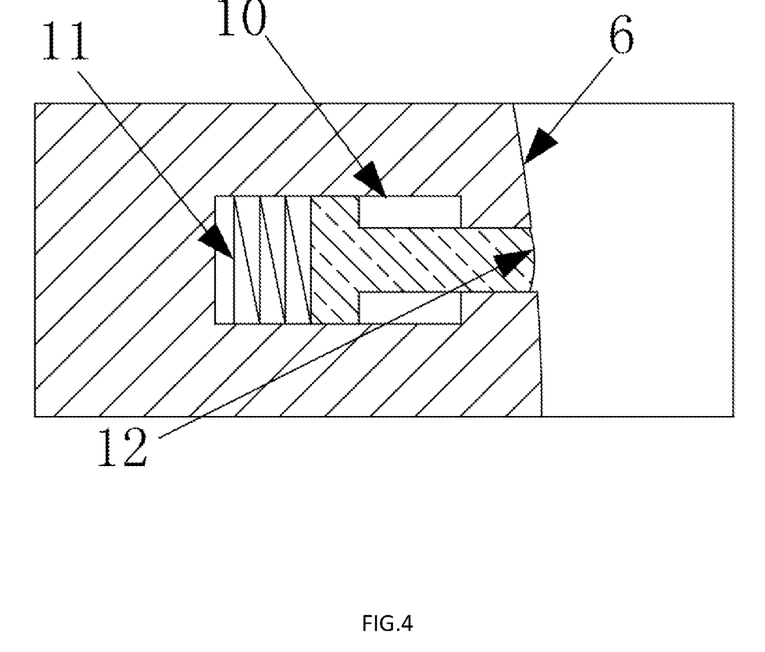
FIG. 4 is a schematic diagram of the engine-sealing pin of the engine according to the invention.

As shown in FIG. 1-2, an oblong-shaped rotor engine having high sealing performance, comprising an upper end cover (1), a lower end cover (2), a rotor (3), three combustion chambers (4), three isolation zones (6), a fuel spray ignition unit (5), a sealing pin row (7) and an eccentric driving shaft (8), wherein, the upper end cover (1) and the lower end cover (2) are connected with each other by screws (9) to form a cylinder of an engine;

a hollow chamber inside the cylinder is a working chamber used for engine operation, which is suitable for the rotation of the rotor (3) and the thermal cycle of the three combustion chambers (4), and the working state in the working chamber is defined by the cylinder profile and the rotor (3) profile;

the entire outline of the cylinder profile is triangular, and three protruding inner concaves are evenly arranged along the cylinder in a cycle to form the three combustion chambers (4), the cylinder profile is formed by the wall curves of the three combustion chambers (4) and the curves of the three isolation zones (6), the wall curves of the three combustion chambers (4) and the curves of the three isolation zones (6) are alternately arranged along the cylinder in a cycle, so that 120-degrees rotational symmetry presents in the cylinder profile;

the entire outline of the rotor (3) profile is oblong-shaped, the central cavity of the rotor (3) is connected with the central cavity of the upper end cover (1) and the central cavity of the lower end cover (2) through the eccentric driving shaft (8), the fuel spray ignition unit (5) is installed on the top of the three combustion chambers (4) for a fuel spray and ignition;

when the engine is working, the eccentric driving shaft (8) and the cylinder profile define the motion mode of planetary gears for the rotor (3), during the rotation of the rotor (3), compression-expansion periodic motion is formed inside the three combustion chambers (4), the compression-expansion motion is repeated two times every rotation of the rotor (3), the fuel spray ignition unit (5) sprays fuel and ignites inside the three combustion chambers (4) at the end of the compression phase, in this thermal cycle process, the respective thermal cycles formed in the three combustion chambers (4) together drive the rotor (3) to rotate and output effective power though the eccentric driving shaft (8).

the sealing pin rows (7) composed of at least four sealing pins are equidistantly arranged on the three isolation zones (6), the sealing pins are installed in the pin holes on the three isolation zones (6), the sliding grooves (10) are installed on the inner walls of the pin holes, the sealing pin can slide through the sliding groove (10) within the sliding scope limited by a block at the end of the sliding groove (10), the sealing pin has a base connected with the bottom of the pin hole through a spring (11), the length of the springs (11) directly influences the function strength and scope of the sealing pins, and the heads of the sealing pins are all equipped with the arc-shaped sliding sealing pieces (12).

the curves of the three isolation zones (6) are all an arc curve, with the parameter equation as follows:

$$\begin{cases} x = e\left(k\cos\left(\frac{2m-1}{3}\pi\right) - q\cos\left[\frac{2m-1}{3}\pi + t\sin^{-1}\left(\frac{3}{k}\right)\right]\right) \\ y = e\left(k\sin\left(\frac{2m-1}{3}\pi\right) - q\sin\left[\frac{2m-1}{3}\pi + t\sin^{-1}\left(\frac{3}{k}\right)\right]\right) \end{cases}$$

wherein, m is serial numbers of the isolation zones with the value range as 1-3, representing the curve of the three isolation zones, respectively; t is variable parameters with the value range as [4.0, 1.0]; k is shape parameters of the cylinder with the value range as 10.0~12.0; e is eccentric distance of the eccentric column on the eccentric driving shaft with the value range as 0.005 m~0.007 m; q is shape parameters of the three isolation zones, representing the ratio between the curvature radius of the isolation zone and the eccentric distance of the eccentric column on the eccentric driving shaft with the value range as 3.0~6.0;

the wall curves of the three combustion chambers (4) have a smooth transition at the intersection with the curves of the three isolation zones (6), the parameter equation of the wall curves of the three combustion chambers (4) is as follows:

$$\begin{cases} x = e\left[\begin{array}{c} k\cos(2\theta) + (2\cos(3\theta) - q) \\ \left(-\frac{3}{k}\sin(3\theta)\sin(2\theta) - \cos(2\theta)\sqrt{1 - \left[\frac{3}{k}\sin(3\theta)\right]^2}\right) \end{array}\right] \\ y = e\left[\begin{array}{c} k\sin(2\theta) + (2\cos(3\theta) - q) \\ \left(\frac{3}{k}\sin(3\theta)\cos(2\theta) + \sin(2\theta)\sqrt{1 - \left[\frac{3}{k}\sin(3\theta)\right]^2}\right) \end{array}\right] \end{cases}$$

wherein, θ is variable parameters with the value range as $$\left[-\frac{1}{6}\pi, \frac{1}{6}\pi\right], \left[\frac{1}{2}\pi, \frac{5}{6}\pi\right] \text{ and } \left[\frac{7}{6}\pi, \frac{3}{2}\pi\right],$$

representing the wall curves of the three combustion chambers (4), respectively;

corresponding to the cylinder profile, the parameter equation of the rotor (3) curve is as follows:

$$\begin{cases} x = e\left[\cos(2\beta) + \cos(3\alpha - \beta) + k\cos(\alpha - \beta) - q\frac{3\cos(3\alpha - \beta) + k\cos(\alpha - \beta)}{\sqrt{k^2 + 9 + 6k\cos(2\alpha)}}\right] \\ y = e\left[\sin(2\beta) + \sin(3\alpha - \beta) + k\sin(\alpha - \beta) - q\frac{3\sin(3\alpha - \beta) + k\sin(\alpha - \beta)}{\sqrt{k^2 + 9 + 6k\cos(2\alpha)}}\right] \end{cases}$$

wherein, α is variable parameters with the value range as [0,2π], β is a rotation angle of the rotor (3);

when the rotor (3) rotates according to the above equation, it is in motion mode of planetary gears, and whatever angle the rotor (3) rotates to, the rotor (3) and the cylinder keep tangency with each other and the tangency point falling on each curve of the three isolation zones, so that the adjacent combustion chambers (4) are isolated from each other by the tangent point falling on the isolation zone (6) between them.

According to the above equations, when taking different values as the parameters k, e, and q within a practicable range, we can obtain different technical solutions for engines. Compared with the original X Engine, we modify the cylinder profile and the rotor profile of the invention, so that the original boundary cusp that divides the wall curve of adjacent combustion chambers is expanded into an arc-shaped isolation zone in a certain length, and the rotor profile has an improvement from an original double-arc outer trochoid to an oblong-shaped curve, which can greatly abate the difficulty in processing the engine rotor and decrease the processing costs of the cylinder profile and rotor profile.

In order to ensure good sealing performance between adjacent cylinders during the high-speed rotation of the rotor (3), the engine has the sealing pin row (7) composed of at least four sealing pins equidistantly arranged on the three isolation zones (6). During the rotation of the rotor (3), the sealing pin row (7) maintains constant contact with the side wall of the rotor (3), and stably seals and isolates the areas on both sides of the sealing pin row (7) by means of the sliding sealing piece (12), thereby abating the flow leakage between adjacent combustion chambers, and ensuring that each combustion chamber has good sealing performance. On the line under the function of the sealing pin, the distance between the intersection of the cylinder profile and the line under the function of the sealing pin and the intersection of the rotor (3) profile and the line under the function of the sealing pin is the distance between the sealing pin and the rotor (3), if the distance between the sealing pin and the rotor (3) is less than the effective distance of the sealing pins, the sealing pin touches the side surface of the rotor (3), being in a sealed state; if the distance between the sealing pin and the rotor (3) is more than the effective distance of the sealing pins, the sealing pin does not touch the side surface of the rotor (3), being in an idle state.

From the perspective of preventing structural wear, abating gas leakage, and decreasing production costs, the invention provides an oblong-shaped rotor engine having high sealing performance, and a new design for the rotor and cylinder profile, and based on this introduces the sealing pin row, which seals the transition zone between different combustion cylinders.

In order to improve the operation characteristics of engines and prevent the structural wear of engines, the invention provides a novel rotor profile and cylinder profile. Differing from the design that a boundary cusp is used to isolate adjacent cylinders in the technical solution of the X Engine, the technical solution provided by the invention isolates adjacent cylinders by using a smooth arc making a steady transition over the outside profile of the combustion chamber. The improved solution still ensures that the rotor is in motion mode of planetary gears, and no matter what angle the rotor rotates to, the rotor and the cylinder keep tangency with each other, with certainty that the tangency point falls on the curve of the isolation zone. Considering that the boundary cusp on the cylinder profile has disappeared, the engine rotor will also be in more stable rotation, and the effect of structural wear caused by the high-speed rotation of the rotor will also be greatly abated.

In order to improve the sealing performance of engines and prevent gas leakage between adjacent cylinders, the invention provides a new engine-sealing method based on the profile change. In order to ensure that the novel engine has better sealing performance, the engine provided by the invention has the sealing pin row composed of multiple sealing pins arranged on the smooth arcs of all the boundaries, and makes certain of combined action of multiple sealing pins during the rotation of the rotor, so as to extend the length under the pressure difference between adjacent combustion cylinders and decrease the pressure gradient in the leakage channel, thereby effectively abating the gas leakage between the cylinders. In order to meet the above requirements, the sealing pin row arranged on the smooth arc should ensure that whatever position the rotor rotates to, at least two sliding sealing pins in the sealing pin row are in a sealed state. Considering that when only two sliding sealing pins exist the sealing pin row, both of them alternately form the sealing, with similar effect to a single sealing pin, and when only three sliding sealing pins exist the sealing pin row, the middle one forms the constant sealing and the ones on the both sides alternately form the sealing, without difference from a single sealing pin. Considering the above factors, only if the sealing pin row arranged on the smooth arc has the number of sealing pins included therein more than or equal to 4, it meets the requirements of the invention.

In order to abate the difficulty in structural processing and decrease the production costs of engines, the invention provides a novel rotor profile. Compared with the triangular-like curve adopted by the Wankel Engine rotor and the double-arc outer trochoid adopted by the X Engine rotor, the oblong-shaped curve adopted in the invention has a simpler shape, less processing difficulty and lower processing costs, and is more suitable for large-scale industrial production. As the number of sealing pins increases, the coupling error margin between the cylinder and the rotor also grows, thereby further decreasing the processing costs of engines.

In order to facilitate the understanding of the above-mentioned technical solution of the invention, we will describe the above-mentioned technical solution of the invention in detail below in the specific embodiments.

Example 1

We take the value of the parameters k as 11, e as 0.006 m and q as 4.5, and assume that each sealing pin row contains 4 sealing pins, and the effective distance of each sealing pins is 0.0016 m, based on this as an example so as to describe the specific operation mode of engines.

Figure 5:
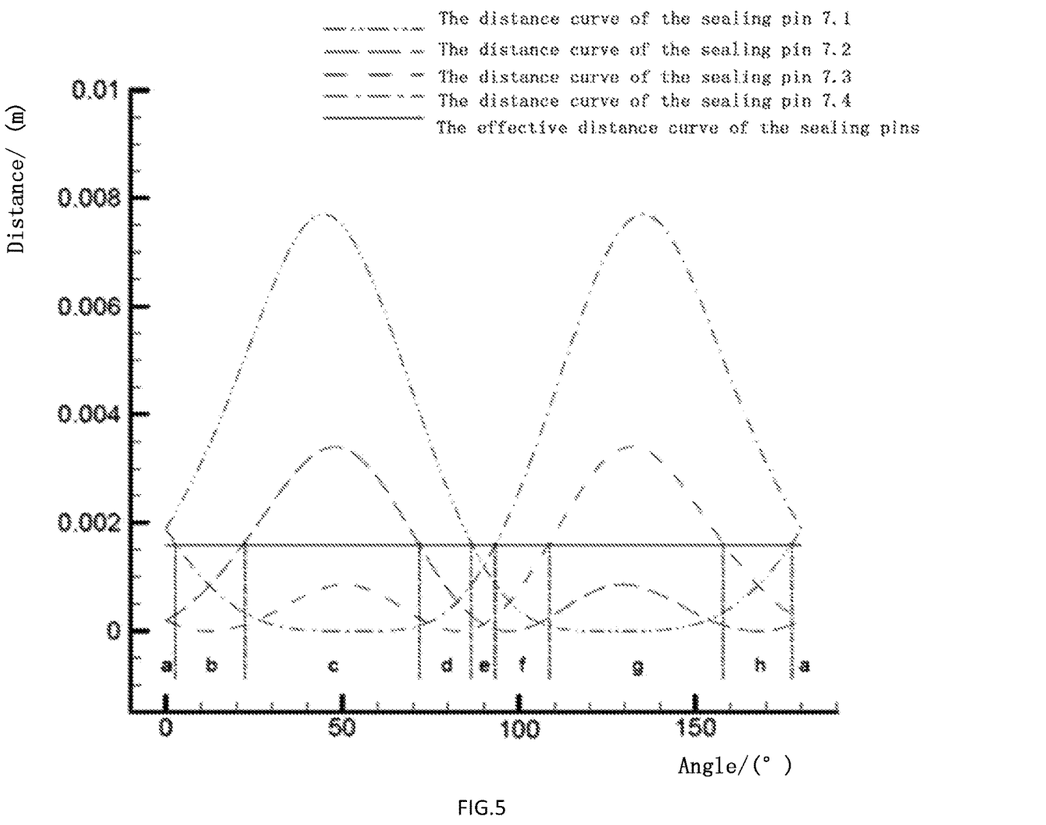
FIG. 5 is a graph showing the variation of the distance between the sealing pin and the rotor with the rotation angle in a single rotation cycle of the invention.

120-degrees rotational symmetry presents in the cylinder profile as a whole, only ⅓ of which therefore has to be considered in this example. As shown in FIG. 3, the sealing pin row 7 composed of 4 sealing pins and longitudinally arranged on the isolation zone 6 is equidistantly arranged in the longitudinal direction. For the convenience of description, the sealing pin row 7 is arranged according to the size of the longitudinal coordinate, being the sealing pins 7.1-7.4 respectively. As shown in FIG. 5, as the distance between each sealing pin and the rotor 3 varies at different positions of the rotor 3, considering the variation of the distance between each sealing pin and the rotor 3 during one cycle of the rotation of the rotor 3, the former four curves in the figure represent the variation curve of the distance between the sealing pins 7.1-7.4 and the rotor 3 with the rotation angle of the rotor 3 (denoted by SPs 7.1-7.4 DC as follows), and the fifth curve represents the effective distance of the four sealing pins (denoted by SPEDC as follows). From the above analysis, it can be seen that when a certain sealing pin curve is below SPEDC, the sealing pin is in a sealed state, otherwise it is in an idle state, so that the rotation process of the rotor 3 is divided into A-H in the total of eight stages as shown in FIG. 5, which are described respectively as follows.

Figure 6:
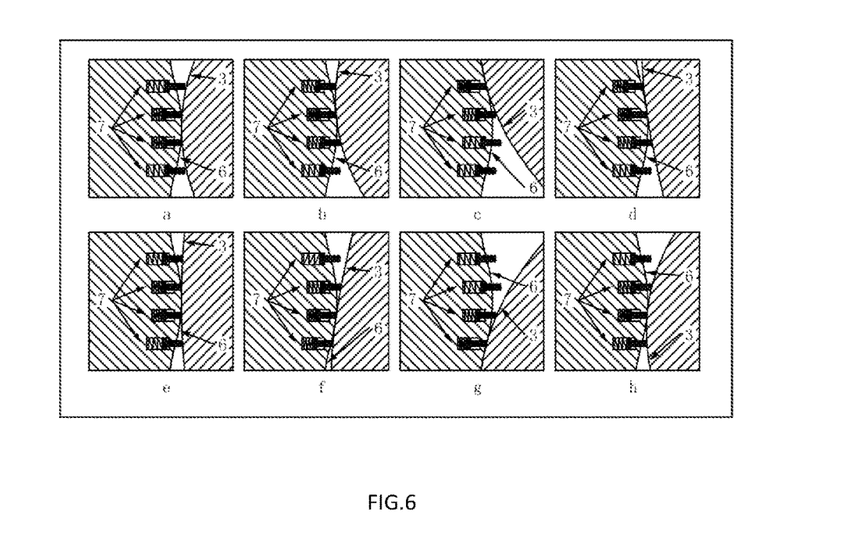

The rotation angle of the rotor 3 corresponding to the stage A is −2~2 degrees, from FIG. 5, it can be seen that the sealing pins 7.2 and 7.3 are in the sealed state, while the sealing pins 7.1 and 7.4 are in the idle state, as the specific physical image of the sealing pin row shown in FIG. 6a, the sealing pins 7.2 and 7.3 form the sealing between the rotor 3 and the cylinder wall. As the rotor 3 continues to rotate, the distance between the sealing pin 7.4 and the rotor 3 begins to decrease, then the sealing pin 7.4 touches the side wall of the rotor 3 and is going to enter the sealed state, until the rotor 3 rotates to 3 degrees, at this time as the rotation enters stage B, the physical image varies from FIG. 6a to FIG. 6b, and the sealing pins 7.2-7.4 form the sealing between the rotor 3 and the cylinder wall. However, as the distance between the sealing pin 7.2 and the rotor 3 is relatively large at this time and the distance is still increasing, the rotation of the rotor 3 will quickly enter the stage C, then the rotation angle of the rotor 3 is 22 degrees, and as the state of the sealing pin 7.2 varies from an sealed state to an idle state, the physical image becomes FIG. 6c, and the sealing pins 7.3 and 7.4 form the sealing between the rotor 3 and the cylinder wall. This stage will continue for a long time until the rotor 3 rotates to 72 degrees, at this time the sealing pin 7.2 touches the side wall of the rotor 3 again, as the rotor 3 rotates into the stage D as shown in FIG. 6d, the sealing pins 7.2-7.4 form the sealing between the rotor 3 and the cylinder wall. As the rotor 3 continues to rotate, the distance between the sealing pin 7.1 and the rotor 3 rapidly decreases until the rotor 3 rotates to 87 degrees, then the sealing pin 7.1 enters a sealed state, as the rotor 3 rotates into the stage E, as shown in FIG. 6e, the four sealing pins all are in a sealed state, and meanwhile seal the cylinder wall up. It can be seen from FIG. 5 that the sealing pin curves 1-4 and the effective distance curve all present symmetry with respect to the symmetry axis at 90 degrees as the rotation angle of the rotor 3, so the stages F-H is the symmetrical inversion of the stages B-D, as shown in FIGS. 6f-6h respectively.

According to the rotation of the rotor 3 and the sealed state in the above single cycle, under the new geometric curve and sealing mode, we can see that whatever angle the rotor 3 rotates to, it is ensured that the adjacent combustion chambers have at least two sealing pins sealing the leakage channel between them. Compared with only one sealing pin forming the sealing between adjacent combustion chambers in the prior art, the invention increases the length under the pressure difference between adjacent combustion chambers by at least one time. It can be reasonably inferred from this that the pressure gradient in the leakage channel of the technical solution of the invention is at most ½ of the pressure gradient of the original solution, considering that the gas leakage is proportional to the pressure gradient, the gas leakage of this solution is only half of the original solution, even smaller, and has better sealing performance than the original solution. Furthermore, as the coupling support between the engine rotor and the cylinder has an improvement from three separate sealing pins to three groups of sealing pin rows, considering the increase in the number of sealing pins, it indirectly enlarges the coupling error margin between the cylinder and the rotor, which can further abate the processing difficulty and decrease the processing costs of engines, and is more suitable for large-scale industrial production.

It should be noted that, on the basis of the above discussion and research on the sealed state of engines, considering the further increase in the number of sealing pins contained in each sealing pin row, the coupling error margin between the cylinder and the rotor will be further increased due to the increase in the number of sealing pins. In addition, we can ensure the at least more sealing pins possibly keep sealing during the rotation of the rotor by adjusting the design parameters of the engine and the effective distance of the sealing pins, which can further increase the length under the pressure difference between adjacent combustion cylinders, thereby further abating gas leakage between combustion cylinders.

In the invention, unless other clear specification and limitation, the terms "installation", "correlation", "connection", "fixing" and other terms should be understood in a broad sense, for example, it may be a fixed connection or a detachable connection, or an integration; it may be a mechanical connection or an electrical connection; it may be directly connected or indirectly connected via an intermediate medium, and it may be the internal connection of two components or the interaction relationship between two components. A person skilled in the art may understand the specific meaning of the above-mentioned terms in the invention according to specific circumstances.

In the invention, unless other clear specification and limitation, the first feature being "above" or "below" the second feature may include the direct contact between the first feature and second feature, or the indirect contact via another feature between them. Moreover, the first feature being "above", "over", and "on" the second feature includes the first feature being right above and obliquely above the second feature, or simply means that the first feature is higher than the second feature in horizontal plane. The first feature being "below", "under", and "down" the second feature includes the first feature being right below and obliquely below the second feature, or simply means that the first feature is lower than the second feature in horizontal plane.

In the invention, the terms "first", "second", third", and "fourth" are only used for descriptive purposes, and cannot be understood as indication or implication for relative importance. Unless other clear specification and limitation, the term "plurality" refers to two or more than two.

The above descriptions are only preferable embodiments of the invention without limitation on the invention, and a person skilled in the art may make various modifications and changes to the invention. Any modification, equivalent replacement, improvement and the likes made within the essence and principle of the invention should be incorporated in the protection scope of the invention.

The invention claimed is:
1. An oblong-shaped rotor engine, comprising:
an upper end cover (1), a lower end cover (2), a rotor (3), three combustion chambers (4), three isolation zones (6), three fuel spray ignition units (5), three sealing pin rows (7) and an eccentric driving shaft (8), wherein, the upper end cover (1) and the lower end cover (2) are connected with each other by screws (9) to form a cylinder;
wherein a hollow chamber inside the cylinder is used for rotation of the rotor (3) and thermal cycle of the three combustion chambers (4), and wherein working state in a working chamber is defined by cylinder profile and rotor (3) profile; wherein outline of the cylinder profile is triangular, wherein three protruding inner concaves are evenly arranged along the cylinder in a cycle to form the three combustion chambers (4), wherein the cylinder profile is formed by wall curves of the three combustion chambers (4) and curves of the three isolation zones (6), wherein the wall curves of the three combustion chambers (4) and the curves of the three isolation zones (6) are alternately arranged along the cylinder in a cycle, so that a 120-degrees rotational symmetry is present in the cylinder profile; wherein outline of the rotor (3) profile is oblong-shaped, wherein a central cavity of the rotor (3) is connected with a central cavity of the upper end cover (1) and a central cavity of the lower end cover (2) through an eccentric driving shaft (8), wherein each of the three fuel spray ignition units (5) is installed on top of each of the three combustion chambers (4); wherein the eccentric driving shaft (8)

and the cylinder profile define a motion mode of planetary gears for the rotor (3), wherein during the rotation of the rotor (3), compression-expansion periodic motion is formed inside the three combustion chambers (4), the compression-expansion motion is repeated two times every rotation of the rotor (3), the respective thermal cycles formed in the three combustion chambers (4) together drive the rotor (3) to rotate and output effective power though the eccentric driving shaft (8), wherein the sealing pin rows (7) further comprise at least four sealing pins, wherein the sealing pins are equidistantly arranged on the three isolation zones (6), wherein the sealing pins are installed in pin holes on the three isolation zones (6), wherein sliding grooves (10) are installed on inner walls of the pin holes, wherein each of the sealing pins can slide through each sliding groove (10) within a sliding scope limited by a block at the end of the sliding groove (10), wherein each of the sealing pins comprises a base connected with bottom of the pin hole through a spring (11) and a head equipped with an arc-shaped sliding sealing piece (12), wherein during the rotation of the rotor (3), the sealing pin row (7) maintains constant contact with side wall of the rotor (3), and seals and isolates the areas on both sides of the sealing pin row (7) by means of the sliding sealing piece (12), wherein curves of the three isolation zones (6) are all an arc curve, with parameter equation as follows:

$$\begin{cases} x = e\left(k\cos\left(\frac{2m-1}{3}\pi\right) - q\cos\left[\frac{2m-1}{3}\pi + t\sin^{-1}\left(\frac{3}{k}\right)\right]\right) \\ y = e\left(k\sin\left(\frac{2m-1}{3}\pi\right) - q\sin\left[\frac{2m-1}{3}\pi - t\sin^{-1}\left(\frac{3}{k}\right)\right]\right) \end{cases}$$

wherein, m is serial numbers of the isolation zones with value range of 1~3, representing the curve of the three isolation zones, respectively; t is variable parameters with value range of [−1.0,1.0]; k is shape parameters of the cylinder with value range of 10.0~12.0; e is eccentric distance of the eccentric column on the eccentric driving shaft with value range of 0.005 m~0.007 m; q is shape parameters of the three isolation zones, representing the ratio between curvature radius of the isolation zone and eccentric distance of eccentric column on the eccentric driving shaft with value range of 3.0~6.0;

wherein wall curves of the three combustion chambers (4) have a smooth transition at the intersection with the curves of the three isolation zones (6), wherein parameter equation of the wall curves of the three combustion chambers (4) is as follows:

$$\begin{cases} x = e\left[\begin{array}{c} k\cos(2\theta) + (2\cos(3\theta) - q) \\ \left(-\frac{3}{k}\sin(3\theta)\sin(2\theta) - \cos(2\theta)\sqrt{1 - \left[\frac{3}{k}\sin(3\theta)\right]^2}\right) \end{array}\right] \\ y = e\left[\begin{array}{c} k\sin(2\theta) + (2\cos(3\theta) - q) \\ \left(\frac{3}{k}\sin(3\theta)\cos(2\theta) + \sin(2\theta)\sqrt{1 - \left[\frac{3}{k}\sin(3\theta)\right]^2}\right) \end{array}\right] \end{cases}$$

wherein, θ is variable parameters with value range of $$\left[-\frac{1}{6}\pi, \frac{1}{6}\pi\right], \left[\frac{1}{2}\pi, \frac{5}{6}\pi\right] \text{ and } \left[\frac{7}{6}\pi, \frac{3}{2}\pi\right],$$

representing wall curves of the three combustion chambers (4), respectively; corresponding to the cylinder profile, wherein parameter equation of the rotor (3) curve is as follows:

$$\begin{cases} x = e\left[\cos(2\beta) + \cos(3\alpha - \beta) + k\cos(\alpha - \beta) - q\frac{3\cos(3\alpha - \beta) + k\cos(\alpha - \beta)}{\sqrt{k^2 + 9 + 6k\cos(2\alpha)}}\right] \\ y = e\left[\sin(2\beta) + \sin(3\alpha - \beta) + k\sin(\alpha - \beta) - q\frac{3\sin(3\alpha - \beta) + k\sin(\alpha - \beta)}{\sqrt{k^2 + 9 + 6k\cos(2\alpha)}}\right] \end{cases}$$

wherein, α is variable parameters with value range of [0,2π], and β is a rotation angle of the rotor (3);

wherein when the rotor (3) rotates according to the above equation, it is in motion mode of planetary gears, wherein the rotor (3) and the cylinder are tangent with each other and a tangency point falling on each curve of the three isolation zones, so that the adjacent combustion chambers (4) are isolated from each other by the tangent point falling on the isolation zone (6) between them.

2. The oblong-shaped rotor engine according to claim 1, wherein each of the at least four sealing pins has an action line formed under a function of sealing pin, a distance between an intersection of the cylinder profile and the action line of the sealing pin and an intersection of the rotor (3) profile and the action line of the sealing pin is an effective distance between the sealing pin and the rotor (3), wherein if a distance between the sealing pin and the rotor (3) is less than the effective distance, the sealing pin touches a side surface of the rotor (3), wherein if the distance between the sealing pin and the rotor (3) is more than the effective distance, the sealing pin does not touch a side surface of the rotor (3).

* * * * *